United States Patent
Kulkarni et al.

(10) Patent No.: US 10,417,427 B2
(45) Date of Patent: *Sep. 17, 2019

(54) METHOD FOR AUTHENTICATING FIRMWARE VOLUME AND SYSTEM THEREFOR

(71) Applicant: DELL PRODUCTS, LP, Round Rock, TX (US)

(72) Inventors: Yogesh P. Kulkarni, Round Rock, TX (US); Sundar Dasar, Round Rock, TX (US); Sumanth Vidyadhara, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/383,453

(22) Filed: Dec. 19, 2016

(65) Prior Publication Data

US 2017/0098084 A1   Apr. 6, 2017

Related U.S. Application Data

(63) Continuation of application No. 14/481,111, filed on Sep. 9, 2014, now Pat. No. 9,524,390.

(51) Int. Cl.
   *G06F 21/57*   (2013.01)
   *G06F 9/4401*   (2018.01)
   *H04L 29/06*   (2006.01)

(52) U.S. Cl.
   CPC ......... *G06F 21/572* (2013.01); *G06F 9/4401* (2013.01); *G06F 21/575* (2013.01); *H04L 63/0823* (2013.01); *H04L 63/20* (2013.01)

(58) Field of Classification Search
   CPC ............................ G06F 21/572; G06F 21/575
   See application file for complete search history.

(56) References Cited

U.S. PATENT DOCUMENTS

| 8,219,792 | B2 | 7/2012 | Jaber et al. |
| 8,589,902 | B2 | 11/2013 | Jones et al. |
| 2008/0244257 | A1 | 10/2008 | Vaid et al. |
| 2009/0327741 | A1 | 12/2009 | Zimmer et al. |
| 2011/0307712 | A1 | 12/2011 | Sakthikumar et al. |
| 2014/0250291 | A1 | 9/2014 | Adams et al. |
| 2014/0365755 | A1 | 12/2014 | Liu et al. |

FOREIGN PATENT DOCUMENTS

EP         1 975 836 A2   10/2008

*Primary Examiner* — Albert Wang
(74) *Attorney, Agent, or Firm* — Larson Newman, LLP

(57) ABSTRACT

A first firmware volume of a Unified Extensible Firmware Interface (UEFI) compliant information handling system is accessed. Authentication information is retrieved from the first firmware volume using a UEFI Secure Architecture Protocol. Based on the authentication information, it is determined if the first firmware volume is a first type of firmware volume. If the first firmware volume is the first type of firmware volume, the first firmware volume is authenticated using the first authentication information and an authentication procedure other than Secure Boot authentication. If the first firmware volume is a second type of firmware volume, the second type different than the first type, the first firmware volume is authenticated using the first authentication information and the Secure Boot authentication.

20 Claims, 5 Drawing Sheets

METHOD FOR AUTHENTICATING FIRMWARE VOLUME AND SYSTEM THEREFOR

CROSS-REFERENCE TO RELATED APPLICATION

This application is a continuation of U.S. patent application Ser. No. 14/481,111, entitled "Method for Authenticating Firmware Volume and System Therefor," filed on Sep. 9, 2014, the disclosure of which is hereby expressly incorporated by reference in its entirety.

FIELD OF THE DISCLOSURE

This disclosure generally relates to information handling systems, and more particularly relates to authenticating a firmware volume at an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
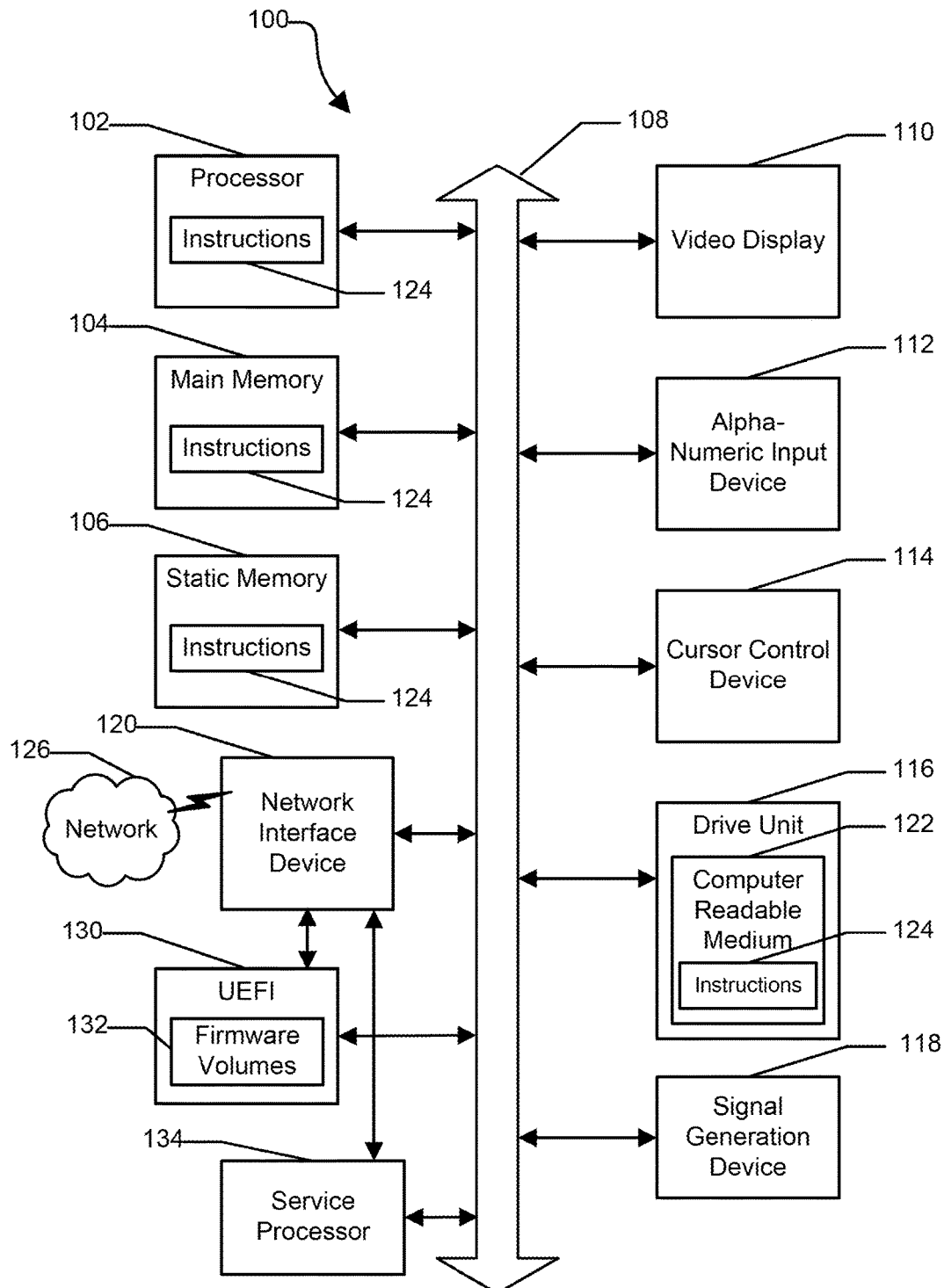
FIG. 1 is a block diagram illustrating an information handling system including a Unified Extensible Firmware Interface (UEFI) in accordance with a specific embodiment of the present disclosure.

FIG. 1 shows an information handling system 100 including a Unified Extensible Firmware Interface (UEFI) 130 and associated firmware volumes 132. In accordance with specific embodiments of the present disclosure, a custom security architecture policy is implemented using a Security Architecture Protocol (SAP) provided by UEFI 130. In one embodiment, the custom security architecture policy can determine whether a firmware volume is a firmware volume provided by an original equipment manufacturer (OEM) of the information handling system, or a volume created by a third party, such as an original design manufacturer (ODM). This determination is based on information stored at each firmware volume. In a specific embodiment, an ODM volume can be authenticated, as a whole, using a single Secure Boot certificate. Similarly, an OEM volume can be authenticated, as a whole, using a single proprietary authentication procedure. After authenticating the firmware volume, individual images within the volume can be launched without further authentication.

The information handling system 100 can include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device 114, such as a mouse. The information handling system 100 can also include a disk drive unit 116, a signal generation device 118, such as a speaker or remote control, and a network interface device 120. The information handling system may also include additional buses operable to transmit information between the various hardware components, and may include additional storage devices, such as non volatile memory devices. The information handling system 100 can include a service processor 134 to enable remote monitoring and management of aspects of the information handling system 100.

For purposes of this disclosure, information handling system 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system 100 may also include one or more buses operable to transmit communications between the various hardware components.

The information handling system 100 is substantially compliant with one or more revisions of the UEFI specification. The UEFI 130 replaces or complements the antiquated basic input/output system (BIOS) found in some older information handling systems. The UEFI specification provides standard interfaces and interoperability guidelines for devices that together make up information handling system 100. In particular, the UEFI 130 provides a standardized architecture and data structures to manage initialization and configuration of devices, booting of platform resources, and passing of control to the operating system. The UEFI specification allows for the extension of platform firmware by loading UEFI driver and UEFI application images. For example, an OEM can include customized or proprietary images to provide enhanced control and management of the information handling system 100. The UEFI specification provides Security Architecture Protocols to abstract policy actions on image invocation, facilitating implementation of custom, proprietary, security policies.

Figure 2:
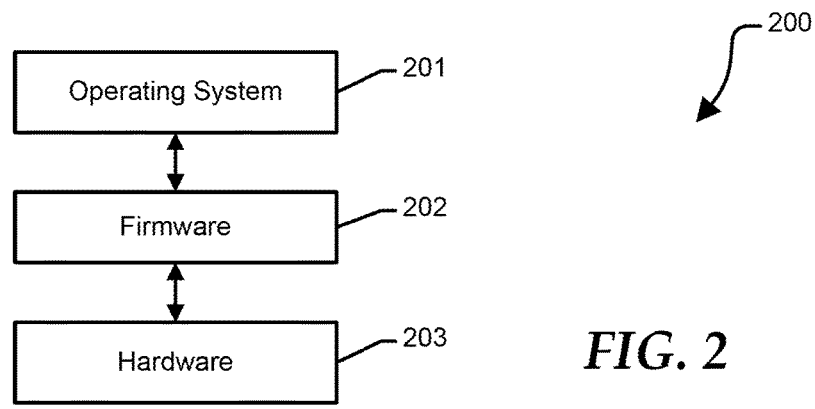
FIG. 2 is a block diagram of a high-level software architecture that illustrates aspects of the UEFI of FIG. 1 according to a specific embodiment of the present disclosure.

FIG. 2 shows a block diagram of a high-level software architecture 200 that illustrates aspects of UEFI that may be utilized in some embodiments, and implemented within information handling system 100. Firmware 202 includes program code configured to provide an interface between an operating system 201 and hardware 203, and further defines device drivers and software processes that define how each device can be accessed. For example, firmware 202 can include a device driver that provides a programmatic interface to network interface device 120. Firmware 202 can be executed as defined by the UEFI specification to provide platform initialization of information handling system 100, installation of operating system 201, and other activities described below.

Figure 3:
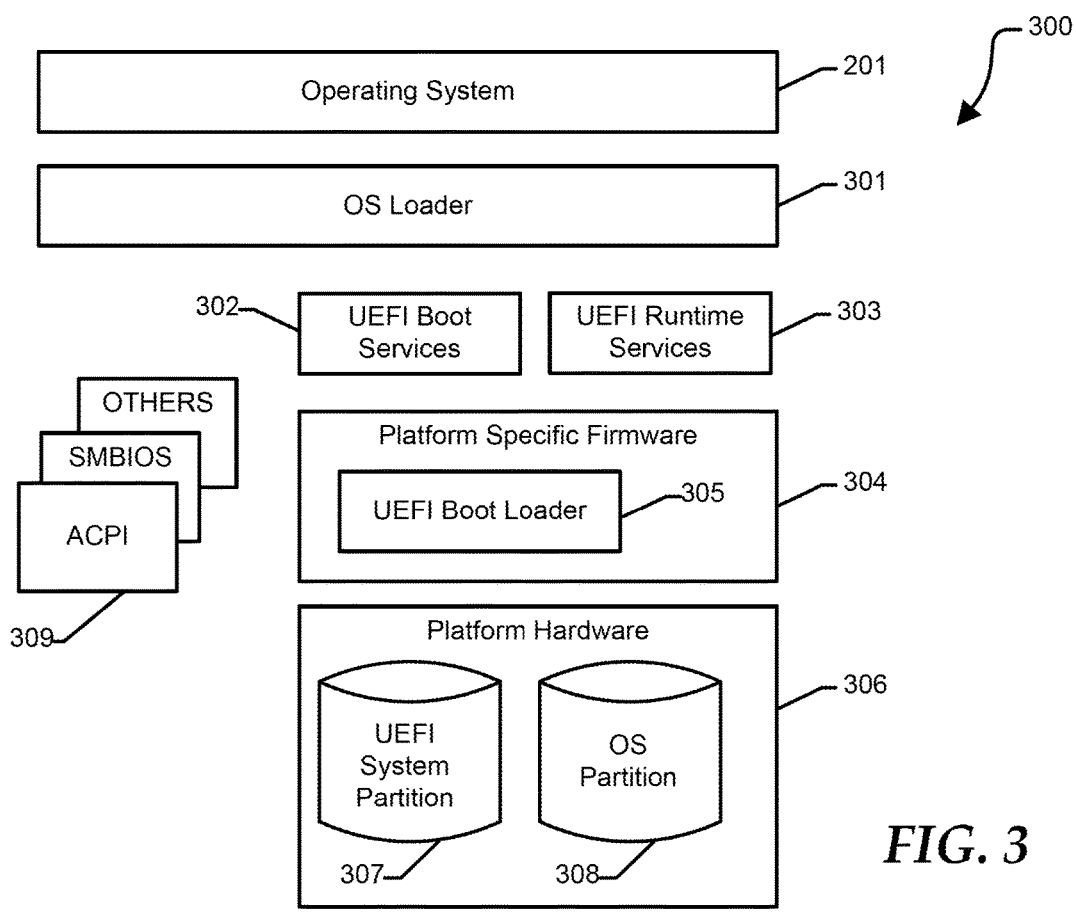
FIG. 3 is a flow diagram illustrating a UEFI platform initialization procedure according to a specific embodiment of the present disclosure.

FIG. 3 shows a block diagram of a software architecture 300 that illustrates aspects of UEFI 130 of FIG. 1 and firmware 202 of FIG. 2. Specifically, software architecture 300 includes platform hardware 306 and OS 201. Platform firmware 304 may retrieve OS program code from UEFI system partition 307 using OS loader 301, also known as a boot loader or OS boot loader. OS loader 301 may retrieve OS program code from other locations, including from attached peripherals or from firmware 202, itself. OS partition 308 may also be present. Once started, OS loader 301 continues to boot OS 201. OS loader 301 may use UEFI boot services 302 to support other specifications 309. Examples of other supported specifications 309 include, but are not limited to, Advanced Configuration and Power Management Interface (ACPI), System Management BIOS (SMBIOS), and the like. UEFI boot services 302 provide interfaces for devices and system functionality that can be used during boot time. UEFI runtime services 303 are available to OS loader 301 during the boot phase and to OS 201 when running. For example, runtime services 303 may be present to ensure appropriate abstraction of base platform hardware resources that may be needed by OS 201 during normal operation.

UEFI allows extension of platform firmware by loading UEFI drivers and UEFI application images which, when loaded, have access to UEFI runtime and boot services. Various program modules provide the boot and runtime services. These program modules may be loaded by boot loader 305 at system boot time. EFI boot loader 305 is a component in the UEFI firmware that determines which program modules should be explicitly loaded and when. Once the UEFI firmware is initialized, it passes control to boot loader 305. Boot loader 305 is then responsible for determining which program modules to load and in which order.

UEFI images can include UEFI drivers, applications, and boot loaders, and are a class of files defined by UEFI that contain executable code. UEFI boot loader 305, and a boot manager in particular, is a firmware policy engine that is in charge of loading the operating system loader and all necessary drivers. UEFI applications can be loaded by the boot manager or by other UEFI applications to accomplish platform specific tasks within the boot services environment. A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol includes a globally unique identifier (GUID), which is a 128-bit value used to differentiate services and structures in the boot services environment.

The UEFI boot flow can be divided into a sequence of phases, including a pre-EFI initialization (PEI) phase, followed by a driver execution environment (DXE) phase, a boot device selection (BDS) phase, and a run time (RT) phase. The UEFI boot sequence can include additional phases, however the present disclosure relates to operations generally performed during the DXE phase, so discussion of the other phases is omitted for clarity. Furthermore, one or more phases can be subdivided into two or more sub-phases.

In an embodiment of the present disclosure, UEFI 130 is configured to distinguish between firmware volumes provided by the OEM from firmware volumes provided by a third party, such as an ODM. In particular, UEFI 130 includes intrinsic program code that may not be aware of which firmware volumes are OEM volumes and which firmware volumes are ODM volumes. During platform initialization, a DXE dispatcher initiates a procedure that include accessing information from each firmware volume that identifies the volume as either an OEM volume or as an ODM volume.

The DXE phase is where most of the system initialization is performed. Pre-EFI Initialization (PEI), the phase prior to DXE, is responsible for initializing permanent memory in the platform so that the DXE phase can be loaded and executed. There are several components in the DXE phase, including a DXE Foundation, DXE Dispatcher, and a set of DXE Drivers. The DXE Foundation is designed to be completely portable with no processor, chipset, or platform dependencies. For example, the DXE Foundations does not contain any hard-coded addresses or any platform-specific information. The DXE Foundation produces a UEFI System Table, and the UEFI System Table is consumed by every DXE driver and executable image invoked by the DXE Dispatcher. It contains all the information required for these components to utilize the services provided by the DXE Foundation and the services provided by any previously loaded DXE driver. For example, the DXE Foundation includes a Firmware Volume Driver, a DXE dispatcher, a Section Extraction Protocol Driver for parsing the contents of a firmware volume, and numerous other components that together provide a self-contained, platform-independent, software environment.

After the DXE Foundation is initialized, control is handed to the DXE Dispatcher. The DXE Dispatcher examines every firmware volume that is present in the system. Firmware volumes are either declared by hand-off blocks (HOBs), or they are declared by DXE drivers. The DXE Dispatcher is responsible for loading and invoking DXE drivers found in firmware volumes. Some DXE drivers may depend on the services produced by other DXE drivers, so the DXE Dispatcher is also required to execute the DXE drivers in the correct order. The DXE Dispatcher must be flexible enough to support a variety of platform specific security policies for loading and executing DXE drivers from firmware volumes. Some platforms may choose to run DXE drivers with no security checks and others may choose to check the validity of a firmware volume before it is used, and other may choose to check the validity of every DXE driver in a firmware volume before it is executed.

In order to support platform specific security policies for DXE driver execution, the DXE Dispatcher is required buy the UEFI specification to use the services of the Security Architecture Protocol (SAP) every time a firmware volume is discovered and every time a DXE driver is loaded. Accordingly, the Security Architecture Protocol provides a convenient location for an OEM to incorporate proprietary security and authentication policies. As disclosed herein, a proprietary authentication policy implemented using the SAP can differentiate ODM and OEM images based on information included at each firmware volume. In one embodiment, the proprietary authentication policy can extract an authentication signature from a firmware volume and attempt to validate the signature using a proprietary (OEM) authentication procedure, such as RSA encryption, a hashing algorithm, or the like. In another embodiment, if the extracted authentication signature is not recognized as an OEM signature, the proprietary authentication policy can attempt to authenticate the extracted signature using a Secure Boot procedure provided by the UEFI specification.

Secure Boot provides a mechanism for authenticating drivers and loaders that can be installed during boot initialization of information handling system 100. The Secure Boot protocol provided by the UEFI specification is configured to prevent the loading of UEFI drivers and operating system (OS) loaders that are not signed with an acceptable digital signature. Secure Boot does this by maintaining databases of software signers and software images that are pre-approved to run on a computer, such as the host server 110. In particular, the Secure Boot protocol defines a signature database (DB) for storing signers or image hashes of UEFI applications, software loaders, and UEFI device drivers that can be loaded on the computer during an initialization (boot) procedure. For example, the DB database can store a signature authorizing execution of an operating system loader, such as the Microsoft Boot Manager. The Secure Boot protocol also defines a revoked signatures database (DBX) for storing images that are no longer trusted and may not be loaded during a boot procedure. For example, a Secure Boot compliant BIOS is configured to execute a signed device driver only if the driver is identified in the DB database, and will refuse to execute the driver if the driver is identified in the DBX database. The Secure Boot protocol further defines a Platform Key (PK) and a Key Exchange Key (KEK). As used herein, the term Secure Boot protocol refers to operational features and requirements defined by the UEFI Secure Boot specification, and should not be confused with a UEFI protocol, which refers to a software interface used for communication between two binary modules.

Databases DB, DBX, PK, and KEK can be stored as authenticated UEFI non-volatile variables in the BIOS flash memory. For example, an original equipment manufacturer (OEM) can store the signature database, the revoked signatures database, and the KEK signature databases on the firmware nonvolatile random access memory (NVRAM) at manufacturing time. After firmware validation and testing, the OEM can lock the firmware and generates a Platform Key. The PK can be used to sign updates to the KEK or to turn off Secure Boot. After the computer is turned on, the signature databases are each checked against the PK. During power-on-self-test (POST), a LoadImage( ) function loads a UEFI image (UEFI executable) into memory and returns a handle to the image. When the UEFI Loadimage( ) function is called, Secure Boot authentication check code can be invoked to make sure the image is from a trusted source, for example the driver's certificate is included in the DB database and is not included in the DBX database. Microsoft Win8 logo requirement introduced two Secure Boot operating modes in BIOS Setup Options, Standard Mode and Custom Mode. In the Standard mode, the keys are pre-provisioned in the BIOS, for example by an OEM. Keys and certificates can only be added or deleted by signing the contents by previously trusted keys that are programmed in the BIOS, or by updating BIOS firmware that contains different keys. In the Custom mode more flexibility is added to allow a physically present user to modify the contents of the Secure Boot signature databases, the user can even turn off Secure Boot by deleting the PK.

Figure 4:
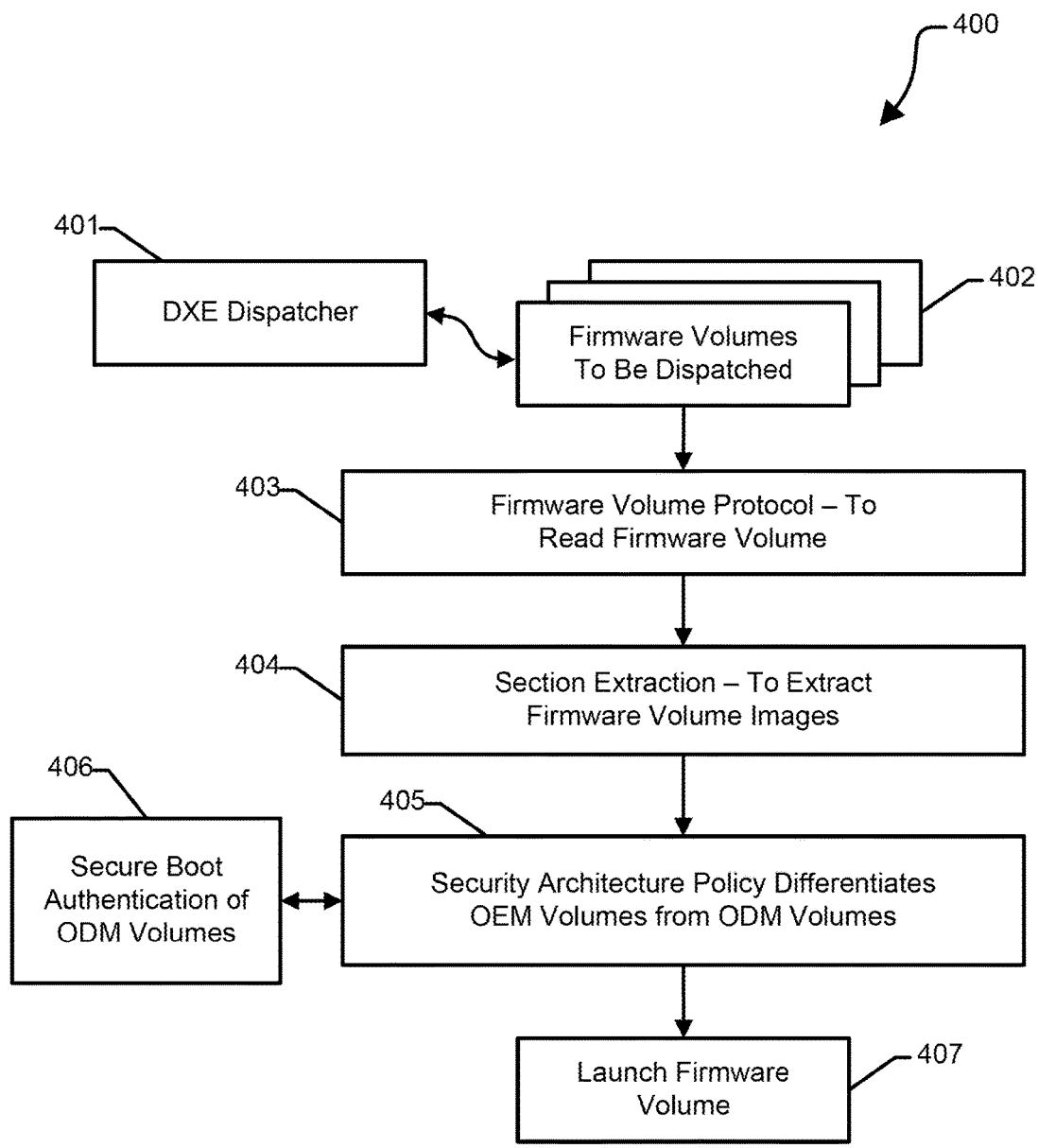
FIG. 4 is a flow diagram illustrating a method for implementing a secure architecture policy according to a specific embodiment of the present disclosure.

FIG. 4 is a flow diagram illustrating a method 400 for implementing a secure architecture policy according to a specific embodiment of the present disclosure. The method 400 begins at block 401 where a DXE dispatcher identifies a firmware volume to be dispatched. The firmware can be included in a set of firmware volumes 402. A firmware volume is a logical firmware device, and is the basic storage repository for data and/or code. Each firmware volume is organized into a file system. The method continues at block 403 where a UEFI Firmware Volume Protocol is executed to read the firmware volume that is being dispatched. For example, the UEFI EFI_FIRMWARE_VOLUME2_PROTOCOL.ReadFile( ) service is configured to retrieve a file from a firmware volume. The method proceeds to block 404 where the firmware volume is parsed to identify firmware sections. For example, a firmware volume can be partitioned into sections, including encapsulation sections and leaf sections. An encapsulation section can include further encapsulation sections and/or leaf sections. Encapsulation sections are essentially containers that hold other sections. In the DXE phase, section-related services are provided through the EFI_FIRWARE_VOLUME2_PROTOCOL services attached to a volume's handle (ReadSection) and the Section Extraction Protocol. A GUID-defined section contains a section-type-specific header that contains an identifying GUID, followed by an arbitrary amount of data. The GUID-defined section is an encapsulation section in which the method of encapsulation is defined by the GUID. A GUID-defined section enables custom encapsulation section types for any purpose. One use of a GUID-defined section is creating an encapsulation section to enable cryptographic authentication of the section contents.

The method 400 continues at block 405 where a proprietary security architecture policy differentiates OEM firmware volumes from ODM firmware volumes. For example, EFI_SECURITY_ARCH_PROTOCOL.FileAuthenticationState( ) is a service of the DXE Foundation that checks the authentication status of a file. This allows information handling system 100 to execute a platform-specific policy in response to different authentication status values. For example, the policy can attempt to authenticate a firmware volume that is determined to be an ODM volume, in its entirety, by determining whether a security certificate extracted from the firmware volume is included in a Secure Boot DB database, as illustrated at block 406. Having successfully authenticated the firmware volume, the method proceeds to block 407 where the firmware volume is launched. In an embodiment, additional images included in the volume need not be individually authenticated using Secure Boot or another authentication procedure because the full volume has already been validated. In another embodiment, the proprietary security architecture policy can define two or more encapsulation sections of an ODM volume that are each authenticated using a corresponding Secure Boot certificate. For example, the security architecture policy can authenticate a plurality of images included within a section by performing a single Secure Boot validation for the entire section. Similarly, the security architecture policy can authenticate a plurality of images included within a section of an OEM volume by performing a single proprietary validation procedure for the entire section, or alternatively, a single Secure Boot validation for the entire section.

Figure 5:
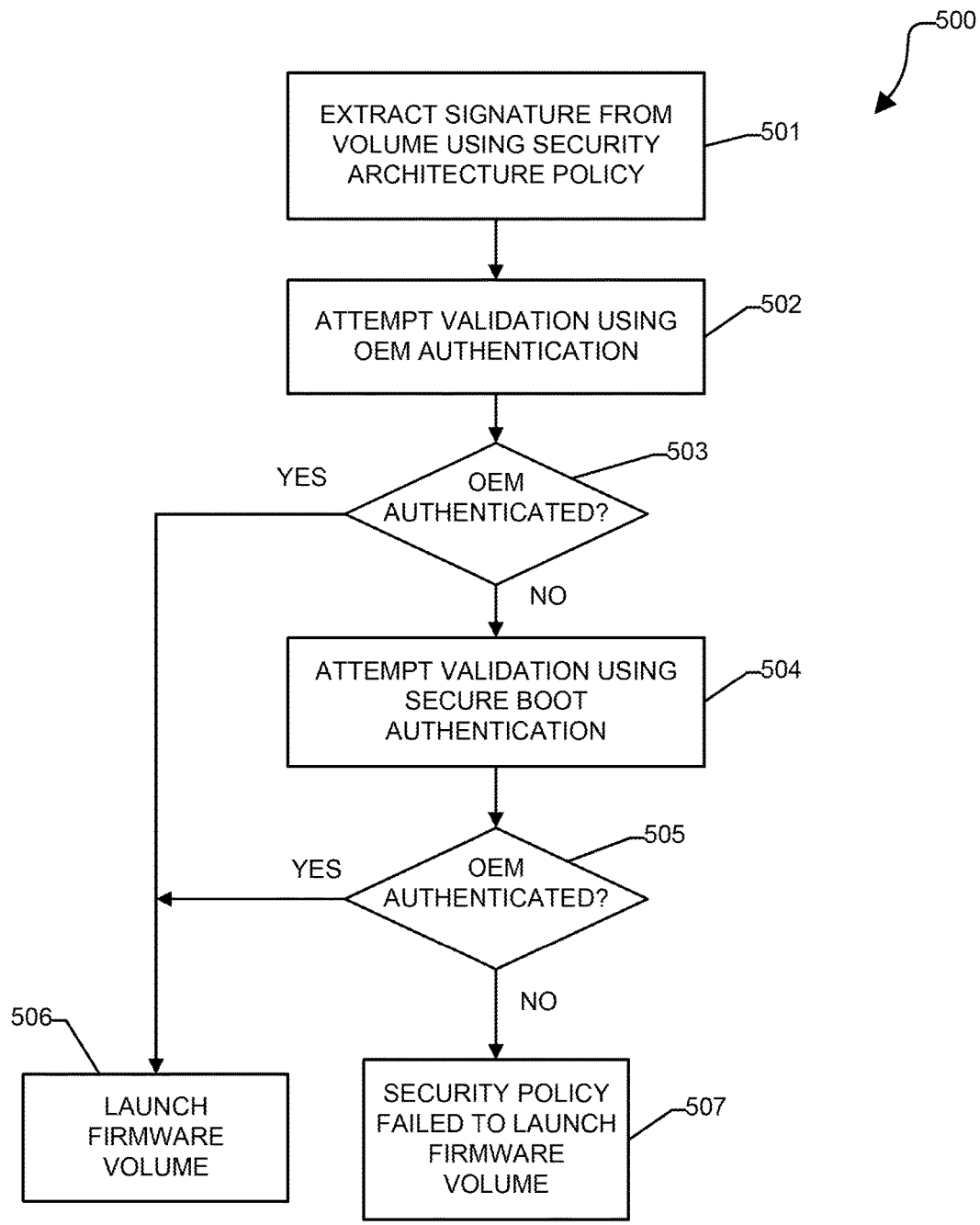
FIG. 5 is a flow diagram illustrating a method for authenticating firmware volumes according to a specific embodiment of the present disclosure.

FIG. 5 is a flow diagram illustrating a method 500 for authenticating firmware volumes according to a specific embodiment of the present disclosure. Method 500 begins at block 501 where information handling system 100 can extract an authentication signature from a firmware volume using a proprietary security architecture policy implemented using the SAP. For example, each volume can include an initial section containing a proprietary authentication signature, a Secure Boot certificate, or the like. The information can be extracted during the DXE phase, as described above. The section can further include information identifying additional sections and custom authentication procedures. The method continues at block 502 where system 100 can attempt to validate the firmware volume using a proprietary OEM authentication procedure. For example, the extracted signature can be evaluated using an RSA algorithm public/private key cryptography, a hash algorithm, or the like. The method continues at decision block 503 where it is determined whether the present firmware volume is an OEM volume based on successful authentication using the OEM authentication procedure. If the volume is successfully authenticated, the method proceeds to block 506 where the firmware volume is launched, including installation of drivers and other images contained in the volume. Note that no additional authentication of the contents of the authenticated OEM volume is necessary, unless directed to do so by the security architecture policy included in the volume.

Returning to decision block 503, if the volume is determined to be an ODM volume based on failure to authenticate the volume using the proprietary authentication procedure, the method proceeds to block 504 where system 100 attempts to validate the volume using Secure Boot Authentication. For example, a certificate extracted from the volume can be compared to certificates included in the Secure Boot DB database and DBX database. If the ODM volume is successfully authenticated using Secure Boot, the method proceeds to block 506 where the volume can be launched. However, if Secure Boot authentication fails, the volume is not launched and remedial procedures can be initiated. As described above, the proprietary security architecture policy can define additional authentication requirements. For example, the policy can specify that authentication, such as Secure Boot authentication, is to be performed on specific encapsulation sections including a plurality of images, or on individual images contained in the volume.

Figure 6:
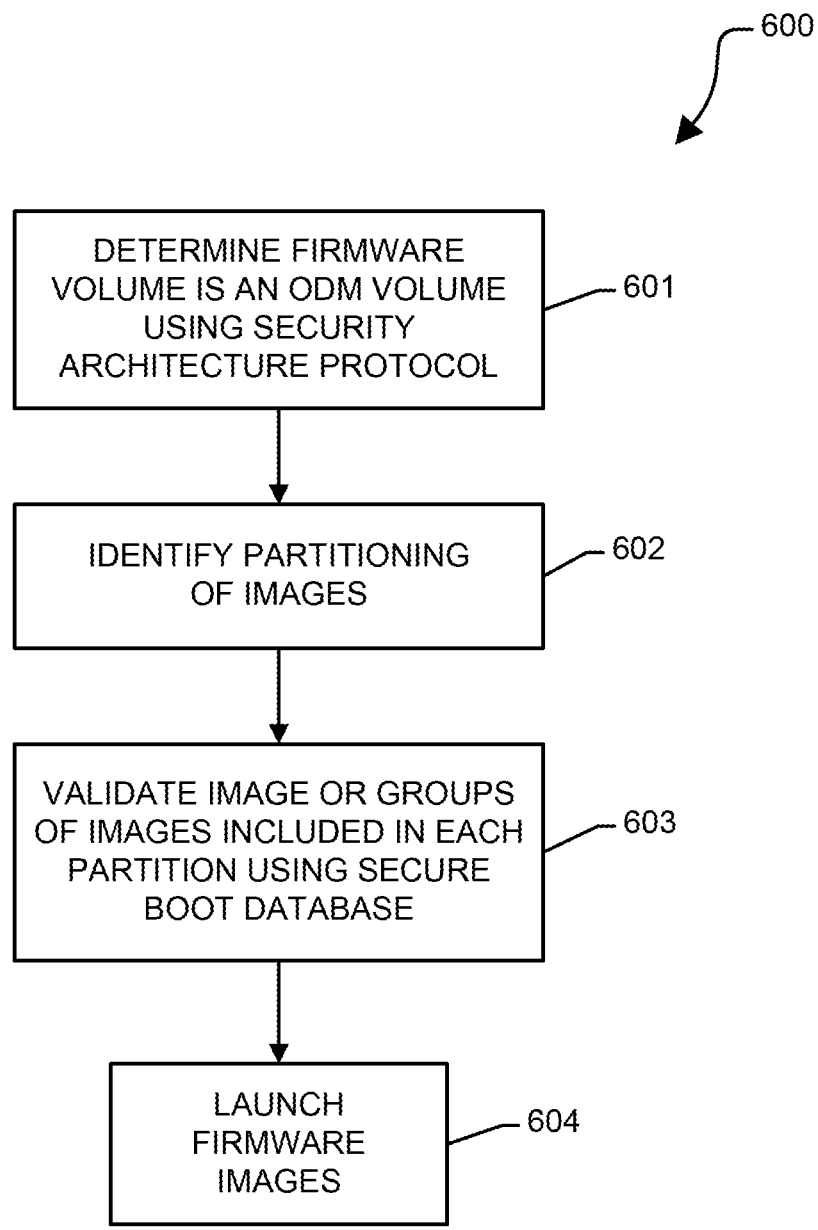
FIG. 6 is a flow diagram illustrating a method for authenticating firmware volumes according to another embodiment of the present disclosure.

FIG. 6 is a flow diagram illustrating a method 600 for authenticating firmware volumes according to another embodiment of the present disclosure. Method 600 begins at block 601 where it is determined that a firmware volume that is presently being dispatched is an ODM volume, using the SAP and proprietary security architecture policy described above. The method continues at block 602 where the proprietary security architecture policy can identify how the volume is partitioned and how each partition should be validated. The method proceeds to block 603 where images, or groups of images, can be validated using Secure Boot authentication. For example, the ODM volume may include two encapsulation sections and each of the sections can be individually validated using a corresponding Secure Boot certificate. The method continues to block 604 where the authenticated firmware images can be launched.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124, such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal; so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   accessing a first firmware volume of a Unified Extensible Firmware Interface (UEFI) compliant information handling system;
   retrieving authentication information from the first firmware volume using a UEFI Secure Architecture Protocol (SAP); and
   determining whether to authenticate the first firmware volume using Secure Boot authentication based on the authentication information.

2. The method of claim 1, further comprising:
   determining that the first firmware volume is provided by an original equipment manufacturer of the information handling system based on the authentication information; and
   authenticating the first firmware volume using the first authentication information and an authentication procedure other than Secure Boot authentication.

3. The method of claim 1, further comprising:
   determining that the first firmware volume is provided by an original design manufacture (ODM), the ODM associated with a component of the information handling system based on the authentication information; and
   authenticating the first firmware volume using the first authentication information and the Secure Boot authentication.

4. The method of claim 1, further comprising:
   executing a plurality of images at the first firmware volume, without conducting further authentication of the images, in response to successful authentication of the first firmware volume.

5. The method of claim 1, wherein a section at the first firmware volume includes a proprietary secure architecture policy, the policy accessed using the SAP.

6. The method of claim 5, wherein the proprietary secure architecture policy identifies a subset of images included at the first firmware volume, the subset including a plurality of images, the subset of images authenticated using only one Secure Boot certificate.

7. The method of claim 1, wherein prior to retrieving the authentication information, a UEFI platform initialization process is not aware of whether the first firmware volume is provided by an original equipment manufacturer of the information handling system or whether the first firmware volume is provided by an original design manufacture (ODM), the ODM associated with a component of the information handling system.

8. A method comprising:
   determining that a first firmware volume is provided by an original equipment manufacturer (OEM) of an information handling system;
   authenticating the first firmware volume using a first authentication procedure, the first authentication procedure other than Secure Boot authentication;

determining that a second firmware volume is provided by an original design manufacturer (ODM), the ODM associated with a component of the information handling system; and authenticating the second firmware volume using Secure Boot authentication.

9. The method of claim 8, wherein authenticating the first firmware volume comprises:

retrieving first authentication information from the first firmware volume using a Unified Extensible Firmware Interface Secure Architecture Protocol;

authenticating the first firmware volume using the first authentication information; and executing a plurality of images included at the first firmware volume, without performing further authentication of the images, in response to determining that the authenticating was successful.

10. The method of claim 8, wherein authenticating the second firmware volume comprises:

retrieving a Secure Boot certificate from the second firmware volume using a Unified Extensible Firmware Interface Secure Architecture Protocol;

authenticating the second firmware volume using the Secure Boot certificate; and executing a plurality of images included at the second firmware volume without performing further authentication of the images.

11. The method of claim 8, wherein authenticating the second firmware volume comprises:

retrieving authentication information from the second firmware volume using a Unified Extensible Firmware Interface Secure Architecture Protocol;

failing to authenticate the second firmware volume using the first authentication procedure; and determining that the second firmware volume is not an OEM firmware volume based on the failing to authenticate.

12. The method of claim 8, wherein a section at the first firmware volume includes a proprietary secure architecture policy and the first authentication information, the policy accessed using a Unified Extensible Firmware Interface Secure Architecture Protocol.

13. An information handling system comprising:

a data storage device for storing a first firmware volume and a second firmware volume; and a processor to:

access the first firmware volume;

retrieve authentication information from the first firmware volume; and classify the first firmware volume as one of two distinct types of firmware volumes based on the authentication information, the two distinct types including a first type and a second type.

14. The information handling system of claim 13, wherein:

if the first firmware volume is the first type of firmware volume, the processor is further to authenticate the first firmware volume using the authentication information and an authentication procedure other than Secure Boot authentication; and if the first firmware volume is the second type of firmware volume, the processor is further to authenticate the first firmware volume using the authentication information and Secure Boot authentication.

15. The information handling system of claim 13, wherein a first type of firmware volume is a firmware volume provided by an original equipment manufacturer of the information handling system.

16. The information handling system of claim 13, wherein the second type of firmware volume is a firmware volume provided by an original design manufacture (ODM), the ODM associated with a component of the information handling system.

17. The information handling system of claim 13, wherein the processor is further to:

execute a plurality of images at the first firmware volume, without conducting further authentication of the images, in response to successful authentication of the first firmware volume.

18. The information handling system of claim 13, wherein a section at the first firmware volume includes a proprietary secure architecture policy and the authentication information, the policy retrieved using a Unified Extensible Firmware Interface Secure Architecture Protocol.

19. The information handling system of claim 18, wherein the proprietary secure architecture policy identifies a subset of images included at the first firmware volume, the subset including a plurality of images, the subset of images authenticated using only one Secure Boot certificate.

20. The information handling system of claim 13, wherein prior to retrieving the authentication information, a Unified Extensible Firmware Interface platform initialization process is not aware of whether the first firmware volume is the first type of firmware volume or the second type of firmware volume.

* * * * *